United States Patent [19]

Rosati

[11] 4,153,599

[45] May 8, 1979

[54] MONOAZO-DYES PARTICULARLY SUITED TO THE LEVELLED DYEING OF SYNTHETIC POLYAMIDE FIBERS

[75] Inventor: Enzo Rosati, Seregno (Milan), Italy

[73] Assignee: Aziende Colori Nazionali Affini -ACNA S.p.A., Milan, Italy

[21] Appl. No.: 838,129

[22] Filed: Sep. 30, 1977

Related U.S. Application Data

[62] Division of Ser. No. 710,397, Aug. 2, 1976, Pat. No. 4,077,765.

[30] Foreign Application Priority Data

Aug. 25, 1975 [IT] Italy ............................... 26540 A/75

[51] Int. Cl.² ..................... C09B 29/14; D06P 1/39; D06P 3/24
[52] U.S. Cl. ............................. 260/207; 260/558 P; 260/562 R; 562/475
[58] Field of Search ........................................ 260/207

[56] References Cited

U.S. PATENT DOCUMENTS

| | | | |
|---|---|---|---|
| 2,098,276 | 11/1937 | Coffey et al. | 260/207 X |
| 3,169,126 | 2/1965 | Merian et al. | 260/206 |
| 3,321,459 | 5/1967 | Voltz et al. | 260/307 |
| 3,578,654 | 5/1971 | Favre | 260/207 X |
| 3,793,309 | 2/1974 | Siegel | 260/207 |

*Primary Examiner*—Floyd D. Higel
*Attorney, Agent, or Firm*—Hubbell, Cohen, Stiefel & Cross

[57] ABSTRACT

Novel monoazo dyes (sparingly soluble in water) which are free of sulphonic groups and which contain an aliphatic-carboxylic chain directly bound to the aryl nucleus of the coupling compound are particularly useful in uniformly dyeing polyamide fibers and/or fabrics yellow to orange-yellow.

1 Claim, No Drawings

MONOAZO-DYES PARTICULARLY SUITED TO THE LEVELLED DYEING OF SYNTHETIC POLYAMIDE FIBERS

CROSS REFERENCE TO RELATED APPLICATIONS

This is a division of application Ser. No. 710,397, filed Aug. 2, 1976, now U.S. Pat. No. 4,077,765.

BACKGROUND OF THE INVENTION

1. Field of the Invention

The present invention relates to a new class of dyes that are only sparingly soluble in water, which are free from sulphonic groups and which carry an aliphatic-carboxylic chain directly bound to the aryl nucleus of the coupling compound. The invention also relates to the use of these dyes in the uniform (levelled) dyeing of polyamide fibers and fabrics.

2. The Prior Art

It is known that with respect to polyamide fibers in particular, it is difficult to obtain dyeings exhibiting excellent uniformity. This is so because of the invariable presence in such fibers of irregularities of a chemical nature (non-homogeneity in the distribution of the basic end groups), or of a physico-chemical or physical nature, such as, for example, the differences in their morphological state, which is more or less crystalline, the differences in the surface structure and in the fiber microporosity, all of which cause variations in the distribution of the dyes in the fiber, and in particular, differences in the behavior of light in relation to diffusion and absorption phenomena. The resulting tinctorial defects are usually called "streakinesses".

Generally, in order to be satisfactory, a dyeing of textile materials should exhibit uniformity and good characteristics of fastness, in particular, fastness to wet treatments.

These two characteristics are not always simultaneously exhibited by a given dye, particularly with regard to the dyeing of polyamide fibers.

In this connection, it can be stated in general, that the faster a dye is to wet treatments, the less satisfactory is its migratory power and, therefore, the less levelling it is on polyamide fibers, and vice-versa.

For dyeing such fibers, dispersed dyes or suitably selected anionic dyes are generally employed.

Dispersed dyes (e.g., Microsetile, ACNA) may be suitably used for preparing light shades, since they possess a high covering power for the fiber irregularities. When preparing medium or full color shades, it is necessary to take into account, in addition to the practical impossibility of obtaining very intense shades with these dyes, their low fastness to wet treatments, as a result of which, these dyeings do not meet the requirements of the various dyed articles. The anionic dyes (e.g. Nailamide, ACNA) offer good possibilities for the preparation of dark color shades, but only scarce possibilities for medium shades while they are generally not at all suited to the preparation of light shades because of their insufficient levelling power. The use of anion-active, cation-active or non-ionogenic auxiliary agents during the dyeing leads to some improvements with regard to the medium shades, but the obtainment of light and well-levelled shades is almost never possible when using these dyes.

SUMMARY OF THE INVENTION

It has now been found that fabrics made of polyamide fibers, even those that are remarkably irregular and/or streaked, are uniformly dyed yellow to orange-yellow in a boiling water bath, at a pH ranging from alkaline to slightly acid, and even when operating in the absence of retarding auxiliary agents, when dyed with a compound of the formula

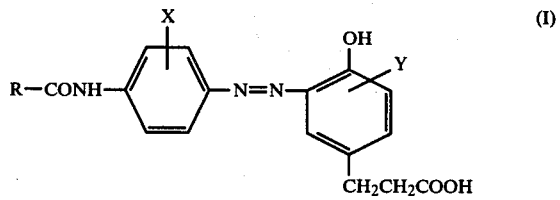

wherein R is a $C_1$–$C_3$ alkyl or an aryl group, optionally substituted by a $C_1$–$C_3$ alkyl or $C_1$–$C_3$ alkoxy group, chlorine, bromine, $NO_2$, CN, lower alkylsulphonyl, $SO_2NH_2$, $CONH_2$, $CONR'R''$, in which R' and R'' are hydrogen or lower alkyl; and X and Y are independently selected from the group consisting of hydrogen, methyl, ethyl, CN, halogen, $NO_2$. Preferably, R is a $C_1$–$C_3$ alkyl or phenyl, X is hydrogen and Y is hydrogen or methyl.

The dyeings so obtained are extremely well levelled, irrespective of the intensity of the dyeing, and their fastness properties, in particular to wet treatments, are excellent.

By comparing the dyes according to the invention with the dyes of the prior art which permit one to obtain the best results with respect to the levelling power, in particular, with: Yellow Nailamide ER, C.I. Acid Yellow 25, No. 18835, it has been surprisingly found that the dyes according to the invention exhibit a substantially higher levelling power, as regards streakinesses, although they have good properties of fastness, particularly to wet treatments.

From a comparison with known dispersed dyes suitable for the dyeing of polyamide fibers, for example, with: Microsetile Yellow 5R, C.I. Disperse Yellow 7, No. 26090, it has been shown that the dyes of the present invention permit one to obtain (the levelling effect being the same) better fastness to wet treatments while retaining at a satisfactory degree, the other fastness properties.

A further important characteristic of the dyes according to the present invention is the obtainment of particularly intense shades. In fact, it has been found that, with equal concentrations, the intensity of the dyeings obtained by using the present dyes is superior to that obtained with the dispersed dyes known to the art. Such intensity is also of the same order of magnitude as that obtained with the anionic dyes, for fully shades, which dyes nevertheless have a low coverage power of the streakinesses.

The best applicative results are obtained by a dyeing method that comprises a first weakly alkaline step; for this purpose it is expedient to use systems buffered with borates and phosphates and containing, in addition, a potential acid such as, ammonium phosphates or sulphates, which permit the dyeing to start at a pH value of 8.5–9, and which thereafter decreases to a weakly acidic final pH value of 5–5.5 by the gradual addition of organic acids and/or acid salts such as, for example, monosodium phosphate, according to conventional techniques.

For light shades it is preferable to complete the dyeing at a pH value of 6–6.5. By this procedure it is possible to attain the best migratory and levelling power without markedly reducing the affinities.

Before dyeing, the textile is scoured in the presence of 1 g/l of Anionic UN 100 (Montedison trademark for a non-ionogenic detergent) and 1–2 g/l of trisodium phosphate, starting the treatment at 30° C. and continuing same for 40 minutes at 80° C.

The dyes of the invention are prepared according to conventional methods, by causing an optionally substituted p-amino-acylanilide to couple — in an alkaline medium — with the selected p-hydroxy-phenyl-propionic acid, also optionally substituted.

DESCRIPTION OF THE PREFERRED EMBODIMENTS

The following examples are given to illustrate the present invention, without being a limitation thereof. In these examples, all parts and percentages given are by weight, unless otherwise indicated.

EXAMPLE 1

3.9 parts of p-amino-acetanilide were dissolved in 50 parts of $H_2O$ and 6.5 parts by volume of concentrated HCl (36%). The amine in solution was diazotized according to conventional procedures at 0°–2° C. by dropping a solution of 1.8 parts of $NaNO_2$ in 30 parts of $H_2O$ into the solution.

The resulting diazonium salt solution was poured at 0°–5° C. into a solution consisting of 4.32 parts of p-hydroxy-phenyl-propionic acid in 50 parts of $H_2O$ and 6.35 parts by volume of a 40% solution of NaOH containing 1.8 parts of $Na_2CO_3$.

At the conclusion of the reaction, a solution of HCl (d = 1.16) was added thereto until the pH reached 3.5. The product was then filtered and washed with $H_2O$. By crystallization from a water-alcohol mixture, 5.3 parts of a dye having the following structure:

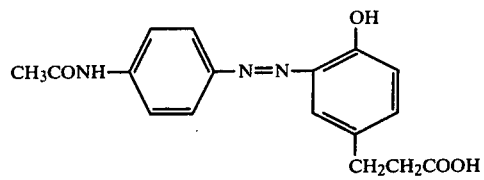

were obtained in the form of an orange-yellow powder. This material dyes polyamide fibers in an intense and pure yellow shade which exhibits excellent fastness to light, and in particular to wet treatments.

EXAMPLE 2

5.3 parts of 1-amino-4-benzoyl-amino-benzene were dispersed in 200 parts of $H_2O$ and 6.25 parts by volume of concentrated HCl (36%). The amine in solution was diazotized according to conventional procedures at 0°–5° C. by dropping a solution of 1.73 parts of $NaNO_2$ in 30 parts of $H_2O$ into the solution. The resulting diazonium salt solution was poured at 0°–5° C. into a solution made up of 4.5 parts of 4-hydroxy-3-methyl-phenyl-propionic acid in 150 parts of $H_2O$ and 6.0 parts by volume of a 40% NaOH solution containing 1.7 parts of $Na_2CO_3$. On completion of the reaction, HCl (d = 1.16) was added thereto until the pH value reached 3.5, after which it was filtered and washed with $H_2O$.

The dye which was obtained in the form of a yellow powder having the structure:

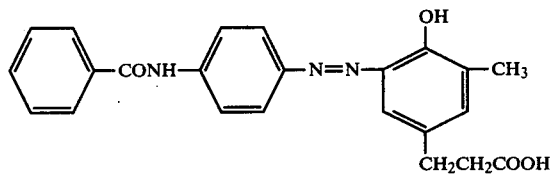

dyes polyamide fibers yellow, the levelling power of the dye being good and the general fastness excellent.

EXAMPLES 3–8

By operating substantially in accordance with the same procedures as are described in Example 1, the dyes reported in the following Table were prepared.

TABLE

| Example | Diazo Component | Coupling Compound | Dyeing Shade On Nylon |
| --- | --- | --- | --- |
| 3 | $CH_3CH_2CONH$—⟨benzene⟩—$NH_2$ | ⟨OH—benzene—$CH_2CH_2COOH$⟩ | Yellow |
| 4 | $CH_3(CH_2)_2CONH$—⟨benzene⟩—$NH_2$ | ⟨OH—benzene—$CH_2CH_2COOH$⟩ | Yellow |

TABLE-continued

| Example | Diazo Component | Coupling Compound | Dyeing Shade On Nylon |
|---|---|---|---|
| 5 | C₆H₅—CONH—C₆H₄—NH₂ | 4-(CH₂CH₂COOH)-phenol | Yellow |
| 6 | CH₃CONH—C₆H₄—NH₂ | 2-CH₃-4-(CH₂CH₂COOH)-phenol | Yellow |
| 7 | CH₃CH₂CONH—C₆H₄—NH₂ | 2-CH₃-4-(CH₂CH₂COOH)-phenol | Yellow |
| 8 | CH₃(CH₂)₂CONH—C₆H₄—NH₂ | 2-CH₃-4-(CH₂CH₂COOH)-phenol | Yellow |

EXAMPLE 9

0.5 part of the dye obtained in Example 1 was suitably microground in a ball mill and accurately dispersed in water.

The resulting dispersion was added to a dyeing bath containing 1 g/l of a surfactant of the non-ionogenic type (for example oxyethylate castor oil, type Emulsion EL), as well as small amounts of ammonium salts (ammonium sulphate and ammonia) so as to attain a pH value of 8-8.5.

The dyeing of 100 parts of a polyamide fabric was started at 70° C., the temperature being gradually raised to boiling. Dyeing was continued at the boiling point for 30-40 minutes, after which acetic acid was gradually added until a final pH value of 5-5.5 was reached, and which caused a good exhaustion of the dyeing bath to occur.

The dyed material was repeatedly rinsed with water and dried with hot air to finally obtain a dyeing exhibiting a bright yellow shade, excellent levelling power and very good fastness to light and wet treatments.

Variations and modifications can, of course, be made without departing from the spirit and scope of my invention.

Having thus described my invention, what I desire to secure by Letters Patent and hereby claim is:

1. A compound of the formula:

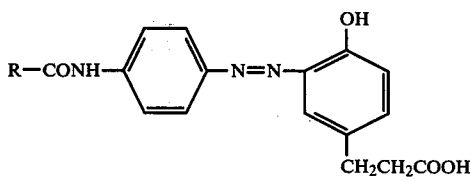

wherein R is $C_1$-$C_3$ alkyl or phenyl.